(12) United States Patent
Kim

(10) Patent No.: US 8,230,127 B2
(45) Date of Patent: Jul. 24, 2012

(54) METHOD OF PROTECTING INPUT/OUTPUT PACKET OF USB DEVICE AND APPARATUS THEREOF

(75) Inventor: Jeom Gab Kim, Seoul (KR)

(73) Assignee: Anhlab, Inc. (KR)

( * ) Notice: Subject to any disclaimer, the term of this patent is extended or adjusted under 35 U.S.C. 154(b) by 30 days.

(21) Appl. No.: 12/670,608

(22) PCT Filed: Jul. 25, 2008

(86) PCT No.: PCT/KR2008/004372
§ 371 (c)(1),
(2), (4) Date: Jun. 18, 2010

(87) PCT Pub. No.: WO2009/014402
PCT Pub. Date: Jan. 29, 2009

(65) Prior Publication Data
US 2010/0257284 A1  Oct. 7, 2010

(30) Foreign Application Priority Data

Jul. 25, 2007  (KR) .................. 10-2007-0074716

(51) Int. Cl.
*G06F 3/00* (2006.01)
*G06F 9/00* (2006.01)
*G06F 9/24* (2006.01)
*G06F 15/177* (2006.01)
*G06F 1/24* (2006.01)
*G06F 11/00* (2006.01)

(52) U.S. Cl. .................. 710/15; 713/1; 713/2; 713/100; 714/1

(58) Field of Classification Search ................ 710/9, 15; 713/1, 2, 100; 714/1
See application file for complete search history.

(56) References Cited

U.S. PATENT DOCUMENTS

| | | | |
|---|---|---|---|
| 6,073,205 A | 6/2000 | Thompson | |
| 6,421,738 B1 * | 7/2002 | Ratan et al. | 719/328 |
| 6,614,420 B1 * | 9/2003 | Han et al. | 345/161 |
| 6,674,743 B1 * | 1/2004 | Amara et al. | 370/351 |
| 6,978,339 B2 | 12/2005 | Isoda | |
| 7,162,566 B2 | 1/2007 | Lin | |
| 2002/0110150 A1 * | 8/2002 | Keys | 370/493 |
| 2004/0162930 A1 * | 8/2004 | Forin et al. | 711/1 |
| 2005/0006468 A1 * | 1/2005 | Fandel et al. | 235/383 |
| 2005/0033880 A1 * | 2/2005 | Lin | 710/52 |

FOREIGN PATENT DOCUMENTS
KR  100549645 B1  1/2006

* cited by examiner

*Primary Examiner* — Chun-Kuan Lee
*Assistant Examiner* — Farley Abad
(74) *Attorney, Agent, or Firm* — Sandra P. Thompson; Buchalter Nemer

(57) ABSTRACT

Disclosed is a method of protecting an input/output packet of a USB device. The method includes: a) registering a filter driver to a USB host controller within a system, and loading the filter driver; b) generating a first filter driver object (filter device object; FiDO), monitoring input/output packets of all USB devices by attaching the first filter driver object (FiDO) to a device object (functional device object; FDO) for the USB host controller; c) determining if there is an identifier in the input/output packet; d) when it is determined that there is the identifier in the input/output packet, registering a data protection routine in the input/output packet; e) copying the input/output packet from the data protection routine to a predetermined region, and exchanging the input/output packet with a predetermined value.

14 Claims, 3 Drawing Sheets

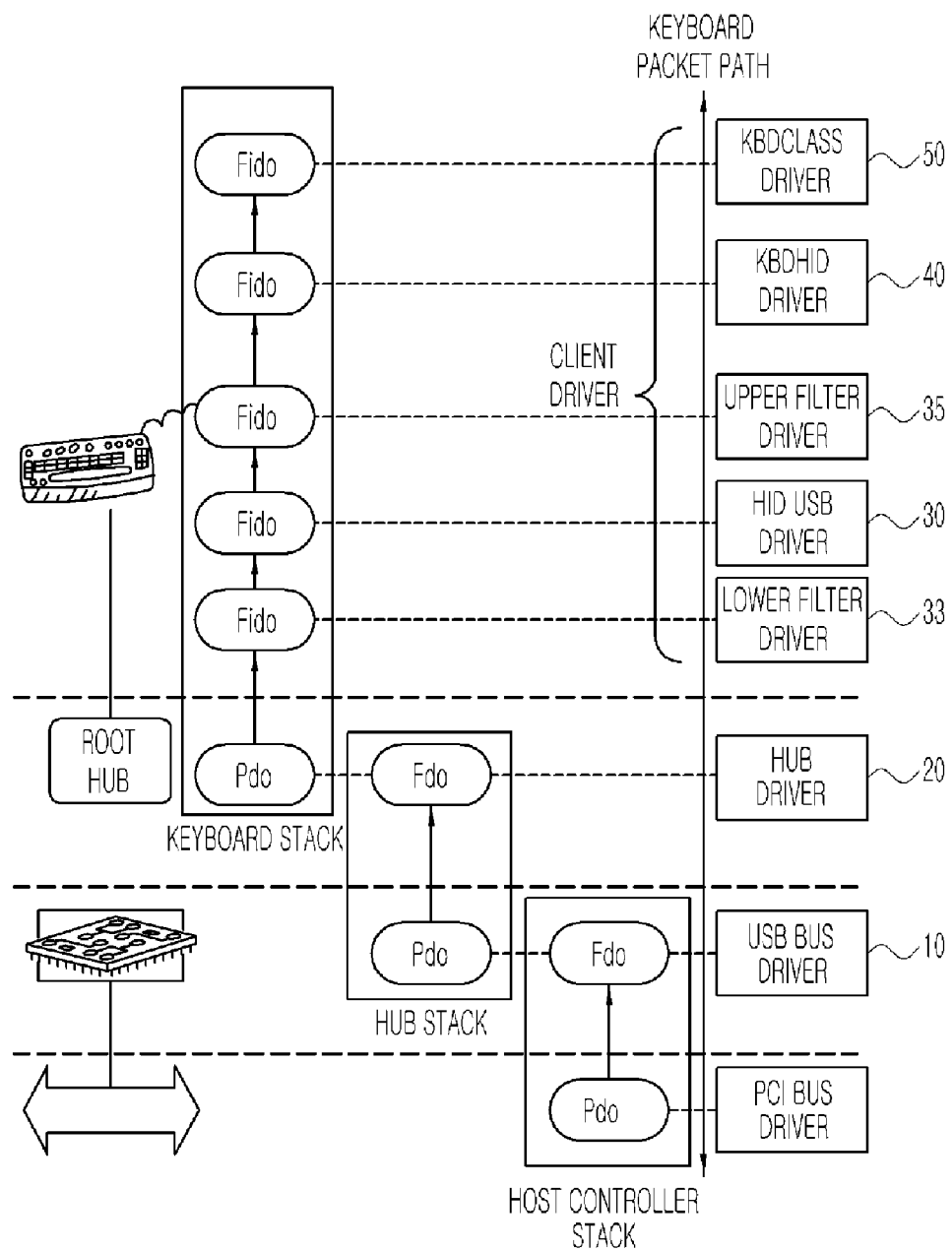
[Fig. 1]

[Fig. 2]
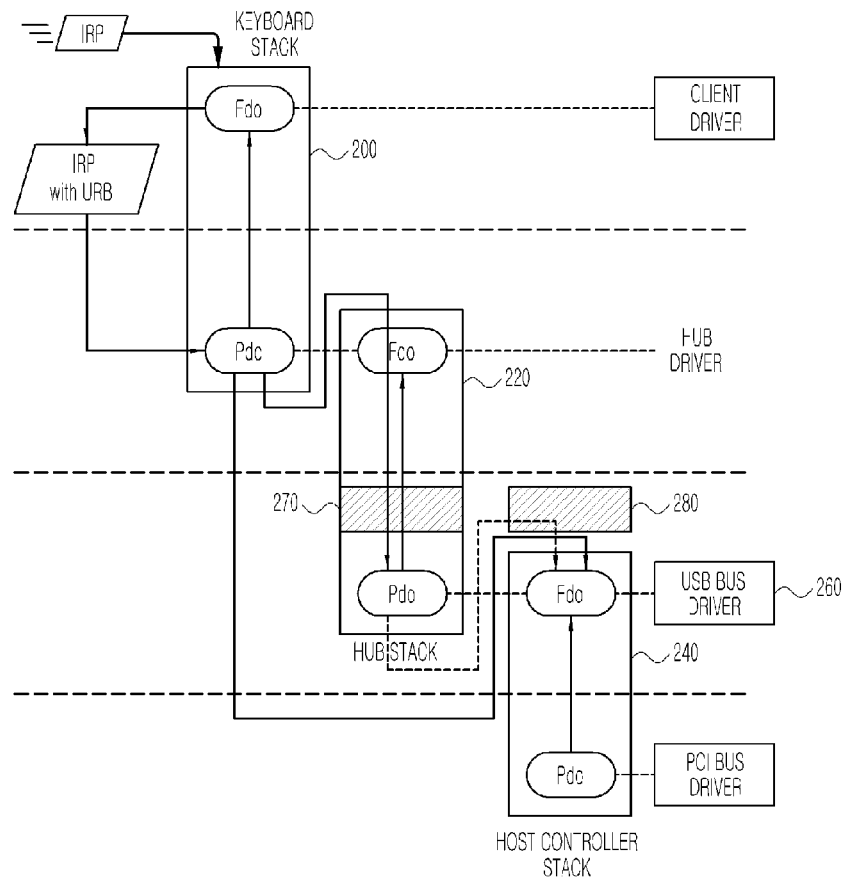
[Fig. 3]
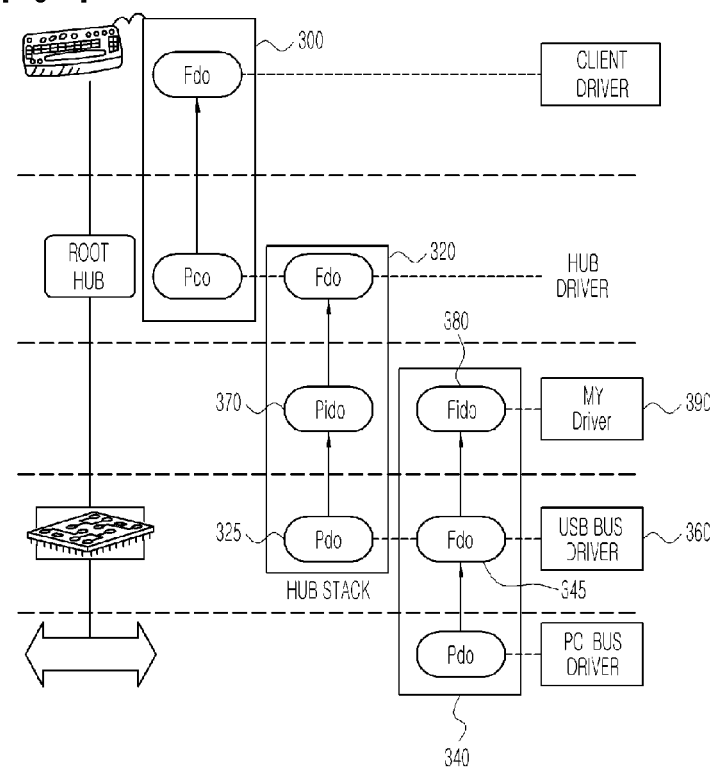

[Fig. 4]
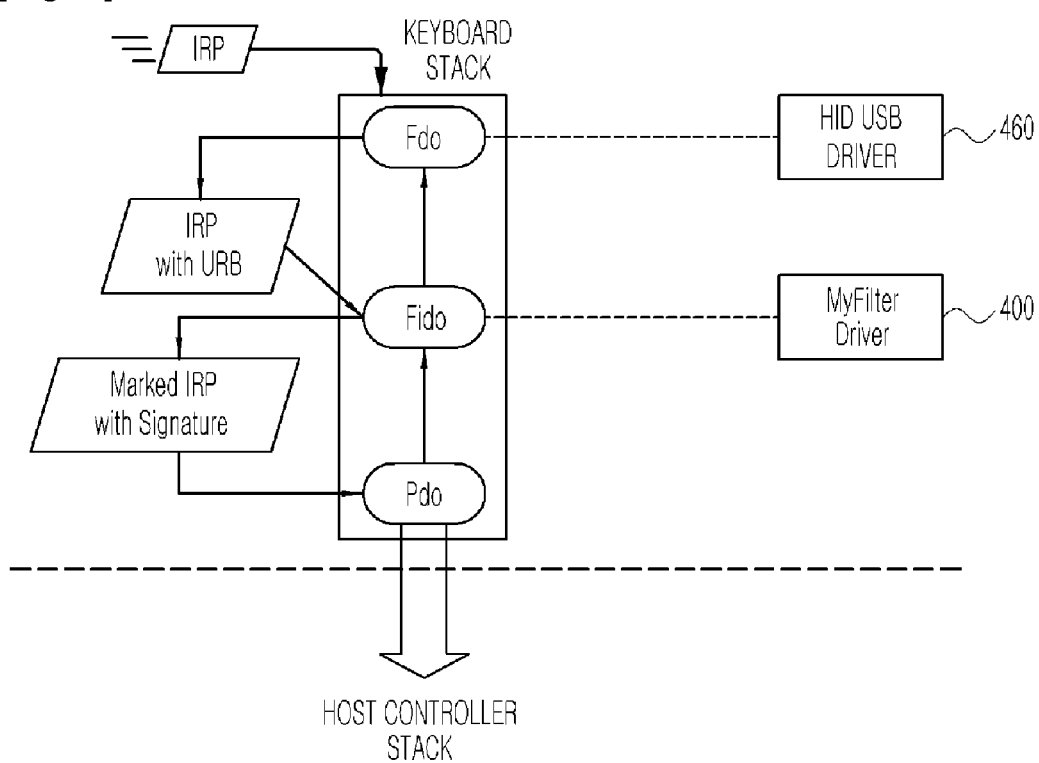

METHOD OF PROTECTING INPUT/OUTPUT PACKET OF USB DEVICE AND APPARATUS THEREOF

TECHNICAL FIELD

The present invention relates to a method of protecting an input/output packet of a USB device, and more particularly to a method of protecting an input/output packet of a USB device by classifying and protecting the input/output packet of USB devices in a USB driver layer where the input/output packets of all USB devices, such as a USB keyboard, connected to USB ports are received first.

BACKGROUND ART

Generally, in interne banking, emailing, or data communication including secret information, various spyware or hacking programs intercept data input through an input device such as a keyboard, and transmit the data to a predetermined email address or a web server in order to drain privacy information or top secret information, etc.

In order to fundamentally block these ill-intentioned programs from being used, security systems and methods related to keyboard security have been researched.

There are two types of keyboards, that is, a PS/2 type and a USB type. In the PS/2 type, physical electrical signals created by operations of a keyboard are transmitted to an operating system, and corresponding interrupt routines are separately processed by queues (first in, first out; FIFO), respectively.

Further, the USB type keyboard is manufactured to exchange messages with an operating system, where packets including multiple data flow between a main body of a computer and peripheral devices in place of simple electrical signals.

FIG. 1 shows a processing path of keyboard data from a general USB keyboard. Here, the keyboard data input from the keyboard passes through a driver layer provided with a universal serial bus (USB) driver 10, a USB hub driver 20, USBCCGP, an HID USB driver 30, a KBD (Keyboard) HID driver 40, and a KBD CLASS driver 50.

Recent USB keyboard security products or malicious keyloggers are using various methods ranging from a filtering-and-hooking method for a layer of the KBD CLASS driver 50 to a filtering-and-hooking method for the HID USB driver 30.

There are an upper filter driver 35 and a lower filter driver 33 provided at both sides of the HID USB driver 30, which protect the keyboard or perform keylogging.

Recently, an HID USB keyboard security product performing hooking for a layer of the USB hub driver 20 has been introduced, and most HID USB keyboard security products and malicious keyloggers use the same technology, which is filtering and hooking, for the layer of the HID USB driver 30, so that interference and collision between security products occurs frequently.

Therefore, since the method of hooking or filtering for the layer of the HID USB driver 30, or hooking or filtering for the layer of the USB hub driver 20, reaches the limits of protection for the USB keyboard data, important information input from a user, that is, the USB keyboard data, cannot be further safely protected.

DISCLOSURE OF INVENTION

Technical Problem

Accordingly, the present invention has been made to solve the above-mentioned problems occurring in the prior art, and the present invention provides a method of protecting desired input/output packets of a predetermined USB device or all USB devices by filtering and hooking the input/output packets of all USB devices, including a human interface device (HID) USB keyboard, in a layer of the USB driver of a host (PC) and by classifying the input/output packets of the USB devices from other type of devices.

Technical Solution

In accordance with an aspect of the present invention, there is provided a method of protecting an input/output packet of a USB device, the method including the steps of: monitoring input/output packets passing through one or more USB drivers within a host apparatus; determining if the input/output packet includes an input/output packet for a predetermined peripheral device; and registering a data protection routine when the input/output packet is determined to be the predetermined peripheral device by the determination step.

In addition, the method may include the steps of: monitoring the input/output packet of the predetermined peripheral device by registering the identifier filter driver to the filter driver of the predetermined peripheral device driver; and inserting an identifier when the input/output packet of the predetermined peripheral device is detected, wherein, in the determination step, the input/output packet is determined to be the predetermined peripheral device when the identifier is included in the input/output packet.

In addition, the step of monitoring may include the step of registering a filter driver which monitors input/output packets passing through the USB driver, so that the filter driver is used for monitoring.

In addition, the step of monitoring may include the step of registering the same clone driver object as the USB driver object, so that the clone driver object is used for monitoring.

In addition, the data protection routine may include the step of exchanging the input/output packet with a predetermined value by copying the input/output packet to a predetermined region.

In addition, the filter driver may create a first filter driver object (filter device object; FiDO), and connect the first filter driver object (FiDO) with a device object (functional device object; FDO) created by the USB driver, so that monitors the input/output packet transmitted to the USB driver.

In addition, the filter driver may create a second filter driver object (physical filter device object; PiDO), and connect the second filter driver object (PiDO) with a device object (physical device object; PDO) for a USB root hub device, so that monitors the input/output packet.

In addition, the step of monitoring by using the clone driver object may include the steps of: hooking an address of a dispatch routine in the clone driver object by changing the address to an address of a predetermined routine; and changing a DriverObject field value of the USB root hub device object in the hooked predetermined routine in order to indicate the clone driver object.

In addition, it is preferable for the DriverObject to be included in a device object (physical device object; PDO) for the USB root hub stack.

In addition, it is preferable for the predetermined routine to be a clone dispatch InternalIoControl.

In accordance with another aspect of the present invention, there is provided an apparatus for protecting an input/output packet of a USB device, the apparatus including: a monitoring module for monitoring input/output packets passing through one or more USB drivers within a host apparatus; a determining module for determining if the input/output packet includes an input/output packet for a predetermined peripheral device; and a data protection module for registering a data protection routine when the input/output packet is determined to be the input/output packet for the predetermined peripheral device by the determining module.

In addition, it is preferable for the determining module to create an identifier filter driver object, to monitor an input/output packet of the predetermined peripheral device by connecting the identifier filter driver object with a device object created by the predetermined peripheral device driver, to insert an identifier when an input/output packet of the predetermined peripheral device is detected, and to determine the detected input/output packet to be an input/output packet for the predetermined peripheral device when the identifier is included in the input/output packet.

In addition, it is preferable for the monitoring module to register a filter driver which monitors input/output packets passing through the USB driver, so that monitors the input/output packets by using the filter driver.

In addition, it is preferable for the monitoring module to register a clone driver object which is the same as the USB driver object, so that monitors the input/output packets by using the clone driver object.

In addition, it is preferable for the data protection module to copy the input/output packet to a predetermined region and exchange the input/output packet with a predetermined value.

In accordance with another aspect of the present invention, there is provided a computer-readable recording media including the steps of: monitoring input/output packets passing through one or more USB drivers within a host apparatus; determining if the input/output packet is an input/output packet for a predetermined peripheral device; and registering a data protection routine when the input/output packet is determined to be the predetermined peripheral device by the determination step.

Advantageous Effects

As described above, according to a method of protecting an input/output packet of a USB device of the present invention, data of all USB devices, including a keyboard, can be originally protected in a host (PC) firstly receiving a USB input/output packet with safety by filtering and hooking a USB driver, and by determining an input/output packet (I/O request packet) in a bus driver layer.

BRIEF DESCRIPTION OF THE DRAWINGS

The foregoing and other objects, features and advantages of the present invention will become more apparent from the following detailed description when taken in conjunction with the accompanying drawings in which:

FIG. 1 is a diagram illustrating a path of processing keyboard data created from a general USB keyboard;

FIG. 2 is a diagram illustrating two paths of an input/output packet according to an embodiment of the present invention;

FIG. 3 is a structural diagram illustrating a method of filtering a USB driver according to an embodiment of the present invention; and FIG. 4 is a flow diagram illustrating a method of determining an input/output packet according to an embodiment of the present invention.

MODE FOR THE INVENTION

Hereinafter, a preferred embodiment of the present invention will now be described with reference to accompanying drawings.

FIG. 2 shows a diagram illustrating two paths of an input/output packet according to an embodiment of the present invention.

Referring to FIG. 2, the input/output packet (I/O request packet) from a USB keyboard is transmitted to a USB driver 260 through a first path where the packet is transmitted via a keyboard stack 200, a hub stack 220, and a host controller stack 240, or through a second path where the packet is transmitted via the keyboard stack 200 and the host controller stack 240 with the hub stack 220 skipped.

Therefore, in order to monitor all input/output packets in a layer of the USB driver 260 including a USB port where a USB cable of the USB keyboard is physically connected to a main body, both of a hub device stack 270 and a bus stack 280 are filtered.

FIG. 3 shows a structural diagram illustrating a method of filtering a USB driver according to an embodiment of the present invention.

Referring to FIG. 3, it is illustrated a procedure where a hub stack 320 and a host controller stack 340 are filtered at the same time by using a physical filter device object (PiDO) 370 and a filter device object (FiDO) 380.

In an application program, all USB host controllers 340 within a system are searched, so that an upper filter driver is registered to the USB host controller 340. After registering, when the corresponding USB host controllers 340 are re-enumerated, a Mydriver 390 is loaded as the upper filter driver of the USB driver 360.

Here, the FiDO 380 is created in the USB host controller 340, and attached to a device object 345 (functional device object; FDO) created from the USB driver 360, which makes it possible to monitor PnP (Plug and Play) packets received to the USB driver 360.

While monitoring the PnP packet, when the USB host controller 340 creates a device object 325 (physical device object; PDO) for a USB root hub device, a PiDO 370 (physical filter device object) is created and connected to the device object 325.

In order to enable an input/output packet, which is transmitted from a keyboard device stack to the host controller stack 340 (i.e. FDO 345) without passing the PiDO 370, to pass through the FiDO 380, USBD_RegisterHcFilter is paged.

Therefore, the Mydriver 390 becomes a filter driver capable of monitoring all input/output packets connected to the PDO 325 or to the FDO 345. The USB driver 360 determines if the input/output packet is a human interface device (HID) USB keyboard packet. If so, the USB driver 360 registers a data protection routine.

The data protection routine refers to a routine, which is paged by the USB driver when the HID USB keyboard packet is detected. The data protection routine receives input key data prior to any other routine.

In the data protection routine, a keyboard value input is copied to a safe region at a desired time, and an original keyboard input value is exchanged with a predetermined garbage value in order to protect keyboard input.

Hereinafter, a method of hooking a USB driver according to an embodiment of the present invention will now be described in detail.

The input/output packets of all USB devices connected to a system pass through anIRP_MJ_INTERNAL_DEVICE_CONTROL dispatch routine of the USB driver. Therefore, when the IRP_MJ_INTERNAL_DEVICE_CONTROL dispatch routine is hooked, it is possible to monitor the input/output packets in a USB driver layer of all USB devices.

In the method of hooking the IRP_MJ_INTERNAL_DEVICE_CONTROL dispatch routine, a driver object is created first, and all information is copied to object values of the USB driver. That is, a clone USB driver object, which equals to the USB driver, is created.

An address of a dispatch routine processing IRP_MJ_INTERNAL_DEVICE_CONTROL Request of the clone driver object is exchanged with that of a Clone Dispatch InternalIoControl routine, which is a driver routine according to the present invention.

Further, the USB driver sets a DriverObject value of the device object for the USB root hub device within the USB host controller to correspond to the clone driver object.

The input/output packets of all USB devices are monitored, and it is determined if the input/output packets is an input/output packet of the HID USB keyboard. If so, the data protection routine is registered in the input/output packet.

The data protection routine is paged by the USB driver whenever the HID USB keyboard packet is detected, and receives input key data before than any other routine.

In the data protection routine, input/output values of the keyboard input are copied to a safe region at a desired time, and an original keyboard input value is exchanged with a predetermined garbage value in order to protect keyboard input.

According to an embodiment, when dispatch routines of each USB driver are hooked, it is determined if the input/output packet received to the dispatch routine has an identifier. When it is determined that there is the identifier in the input/output packet, the data protection routine is registered in the input/output packet. The input/output packet is copied to a predetermined region in the data protection routine, and exchanged with a predetermined value.

FIG. 4 shows a flow diagram illustrating a method of determining an input/output packet according to an embodiment of the present invention.

The input/output packets for the USB devices may be hooked by the filter driver or hooking driver of the USB driver layer. Therefore, in order to determine where each of the packets belongs, the HID USB keyboard identifier filter driver 400 is registered, and the HID USB keyboard filter driver implants an identifier into the input/output packet, so that the USB hooking/filter driver can read the identifier.

In addition, after finding the HID USB keyboards, the identifier filter driver of the HID USB driver 460 is registered in corresponding keyboards. The newly registered filter drivers 400 are loaded by re-enumerating the corresponding keyboards.

When the keyboard input/output packet is detected in the identifier filter driver 400, the identifier is implanted into the keyboard input/output packet. When the USB filter or the hooking driver (routine), which receives the keyboard input/output packet implanted with the identifier, detects the identifier, a protection function for the keyboard input/output packet is performed.

According to an embodiment, in the case of an external USB CD-ROM, CD-RW, or DVD-RW, a driver for implanting an identifier is a class filter (upper or lower filter) of cdrom.sys, which is a CD-ROM class driver. The class filter of cdrom.sys implants the identifier into the input/output packet.

According to another embodiment, a USB memory stick can implant the identifier into the input/output packet in filter (upper or lower filter) of disk.sys, that is, disk class, and can implant the identifier into the input/output packet in a filter (upper or lower filter) of USBSTOR.sys.

In still another embodiment, in a case where the input/output packet is that of a USB mouse, the identifier is implanted into an HIDUSB filter (upper or lower).

While the invention has been shown and described with reference to certain exemplary embodiments thereof, the present invention is not limited to the above-mentioned embodiments, it will be understood by those skilled in the art that various changes in form and details may be made therein without departing from the spirit and scope of the invention as defined by the appended claims.

The invention claimed is:

1. A method of protecting an input/output packet of a USB device, the method comprising the steps of:
    monitoring input/output packets passing through one or more USB drivers within a host apparatus, wherein monitoring comprises the steps of registering a clone driver object as a USB driver object, so that the clone driver object is used for monitoring; hooking an address of a dispatch routine in the clone driver object by changing the address to an address of a predetermined routine; and changing a DriverObject field value of a USB root hub device object in the hooked predetermined routine in order to indicate the clone driver object;
    determining if the input/output packet is an input/output packet for a predetermined peripheral device; and
    registering a data protection routine when the input/output packet is determined to be the input/output packet for the predetermined peripheral device by the determination step.

2. The method as claimed in claim 1, further comprising the steps of:
    monitoring the input/output packet of the predetermined peripheral device by registering an identifier filter driver to the filter driver of the predetermined peripheral device driver; and
    inserting an identifier when the input/output packet of the predetermined peripheral device is detected by monitoring the input/output packet of the predetermined peripheral device,
    wherein, in the determination step, the input/output packet is determined to be the input/output packet for the predetermined peripheral device when the identifier is included in the input/output packet.

3. The method as claimed in claim 1, wherein the step of monitoring comprises a step of registering a filter driver which monitors input/output packets passing through the USB driver, so that the filter driver is used for monitoring.

4. The method as claimed in claim 3, wherein the filter driver creates a first filter driver object, and connects the first filter driver object with a device object created by the USB driver, so that monitors the input/output packet transmitted to the USB driver.

5. The method as claimed in claim 4, wherein the filter driver creates a second filter driver object, and connects the second filter driver object with a device object for a USB root hub device, so that monitors the input/output packet.

6. The method as claimed in claim 1, wherein the data protection routine comprises a step of exchanging the input/output packet with a predetermined value by copying the input/output packet to a predetermined region.

7. The method as claimed in claim 1, wherein the DriverObject is included in a device object for the USB root hub stack.

8. The method as claimed in claim 7, wherein the predetermined routine includes a clone dispatch InternalIoControl.

9. An apparatus for protecting an input/output packet of a USB device, the apparatus comprising:

a monitoring module for monitoring input/output packets passing through one or more USB drivers within a host apparatus; wherein the monitoring module registers a clone driver object as a USB driver object, so that the clone driver object is used for monitoring; hooks an address of a dispatch routine in the clone driver object by changing the address to an address of a predetermined routine; and changes a DriverObject field value of a USB root hub device object in the hooked predetermined routine in order to indicate the clone driver object;

a determining module for determining if the input/output packet includes an input/output packet for a predetermined peripheral device; and a data protection module for registering a data protection routine when the input/output packet is determined to be the input/output packet for the predetermined peripheral device by the determining module.

10. The apparatus as claimed in claim 9, wherein the determining module registers an identifier filter driver as a driver of a predetermined peripheral device, monitors an input/output packet of the predetermined peripheral device, and inserts an identifier, and the detected input/output packet is determined to be an input/output packet for the predetermined peripheral device when the identifier is included in the input/output packet.

11. The apparatus as claimed in claim 9, wherein the monitoring module registers input/output packets passing through the USB driver, so that monitors the input/output packets by using the filter driver.

12. The apparatus as claimed in claim 9, wherein the monitoring module registers a clone driver object which is the same as the USB driver object, so that monitors the input/output packets by using the clone driver object.

13. The apparatus as claimed in claim 9, wherein the data protection module copies the input/output packet to a predetermined region and exchange the input/output packet with a predetermined value.

14. A computer-readable recording non-transitory media comprising the steps of:

monitoring input/output packets passing through one or more USB drivers within a host apparatus, wherein monitoring comprises the steps of registering a clone driver object as a USB driver object, so that the clone driver object is used for monitoring; hooking an address of a dispatch routine in the clone driver object by changing the address to an address of a predetermined routine; and changing a DriverObject field value of a USB root hub device object in the hooked predetermined routine in order to indicate the clone driver object;

determining if the input/output packet is an input/output packet for a predetermined peripheral device; and registering a data protection routine when the input/output packet is determined to be the input/output packet for the predetermined peripheral device by the determination step.

* * * * *